UNITED STATES PATENT OFFICE.

KAMETARO KAWAI AND ZENBEI MIWA, OF TOKYO, JAPAN.

COMPOSITION FOR COATING PHARMACEUTICAL PREPARATIONS.

1,161,690.      Specification of Letters Patent.      Patented Nov. 23, 1915.

No Drawing. Original application filed June 6, 1912, Serial No. 702,092. Divided and this applicaton filed March 31, 1913. Serial No. 758,020.

*To all whom it may concern:*

Be it known that we, KAMETARO KAWAI and ZENBEI MIWA, both subjects of the Emperor of Japan, residing at Tokyo, Japan, have invented a new and useful Composition for Coating Pharmaceutical Preparations.

This invention relates to a method for applying a protective coating to tablets, pills and such like.

In Patent No. 1,122,294, issued December 29, 1914, of which the present application is a divisional, we have described a method of making solid preparations containing oils. The method which forms the subject matter of the present application is especially useful for improving the products of said method of making the solid preparations.

An object of our invention is to improve the taste of preparations, which in themselves would not have a very agreeable taste.

Another object of the invention is to protect the preparations against the influence of the atmosphere, and to prevent decomposition or deterioration of the preparations.

Another object of the invention is to give a smooth surface to the preparations, so that they may be swallowed easier.

When the tablets, pills or such like are prepared so as to be of a suitable consistency, they are dipped into a mixture having the following ingredients:

| | | |
|---|---|---|
| Gelatin | 38.0 | parts. |
| Agar-agar | 1.5 | " |
| Water | 56.0 | " |
| Sugar | 16.0 | " |
| Glycerin | 36.0 | " |

The mixture is prepared in the following way: Gelatin and agar-agar are heated in water to the boiling point, then glycerin and refined sugar are added, while the mixture is heated and while it is stirred thoroughly. The pharmaceutical preparations are quickly dipped into the mixture and removed again, for, if they would remain too long in the mixture the heat of the mixture might have a detrimental influence thereon. After the removal from the mixture it is advisable to apply a film or layer of sugar in powdered form to the outer surface of the preparations. They are therefore placed on layers of powdered sugar and are cooled in this manner, until the coating is completely solidified.

The coating applied in this way renders the preparations proof against the influence of the atmosphere, prevents decomposition, sweetens the taste, and gives the same a smooth, slippery surface.

We claim:

A coating composition for pharmaceutical preparations, which consists of 38 parts of gelatin, 1.5 parts of agar-agar, 56 parts of water, 16 parts of sugar and 36 parts of glycerin.

In testimony whereof we affix our signatures in the presence of two witnesses.

KAMETARO KAWAI.
ZENBEI MIWA.

Witnesses:
   D. MURAMOTO,
   H. F. HAWLEY.